(12) United States Patent
Koenig

(10) Patent No.: US 11,186,215 B2
(45) Date of Patent: Nov. 30, 2021

(54) SYSTEM AND METHOD FOR LOADING A TRAILER AND LIMITING THE WEIGHT ON AN AXLE

(71) Applicant: Mark E. Koenig, Pickerington, OH (US)

(72) Inventor: Mark E. Koenig, Pickerington, OH (US)

(73) Assignee: Komar Industries, LLC, Groveport, OH (US)

( * ) Notice: Subject to any disclaimer, the term of this patent is extended or adjusted under 35 U.S.C. 154(b) by 0 days.

(21) Appl. No.: 16/138,549

(22) Filed: Sep. 21, 2018

(65) Prior Publication Data

US 2019/0092208 A1 Mar. 28, 2019

Related U.S. Application Data

(60) Provisional application No. 62/562,354, filed on Sep. 22, 2017, provisional application No. 62/577,458, filed on Oct. 26, 2017.

(51) Int. Cl.
*B60P 1/42* (2006.01)
*B65G 67/06* (2006.01)
*B60P 1/40* (2006.01)

(52) U.S. Cl.
CPC .............. *B60P 1/42* (2013.01); *B65G 67/06* (2013.01); *B60P 1/40* (2013.01)

(58) Field of Classification Search
CPC .................................. B60P 1/42; B60P 1/40
USPC .......................... 414/526, 532, 533, 534, 535
See application file for complete search history.

(56) References Cited

U.S. PATENT DOCUMENTS

| | | | |
|---|---|---|---|
| 4,660,843 A * | 4/1987 | Hicks | B60P 1/18 280/149.2 |
| 7,785,059 B2 * | 8/2010 | Bandstra | B60P 1/60 414/502 |
| 2005/0241916 A1 * | 11/2005 | Gentili | B65G 33/265 198/545 |
| 2016/0010295 A1 * | 1/2016 | Boschung | B60P 1/40 239/650 |
| 2016/0207484 A1 * | 7/2016 | Rogers | B60R 19/565 |
| 2017/0016757 A1 * | 1/2017 | Strong | G01G 19/08 |

OTHER PUBLICATIONS

Komar Industries, Inc, Komar Auger-Pak, brochure, Sep. 25, 2017, 2 pages.
Pro-Haul, 20" Pro-Haul Tri Axle Intermodal Chassis, Sep. 25, 2017, 6 pages.
Komar Industries, Komar Auger-Pak EM-General Series Compactors, example of loading a roll off container, webpage, https://www.komarindustries.com/equipment/auger-compactors/em-general-series/, accessed Jun. 28, 2021.

\* cited by examiner

*Primary Examiner* — Saul Rodriguez
*Assistant Examiner* — Willie Berry, Jr.
(74) *Attorney, Agent, or Firm* — Standley Law Group LLP; Jeffrey C. Norris; Eric M. Gayan

(57) ABSTRACT

A system and method comprising a feed delivery system that is adapted to load material into a trailer. The trailer may have at least one moveable axle that allows for the axle to be positioned such that there is not excessive weight on the axle due to the trailer.

20 Claims, 5 Drawing Sheets

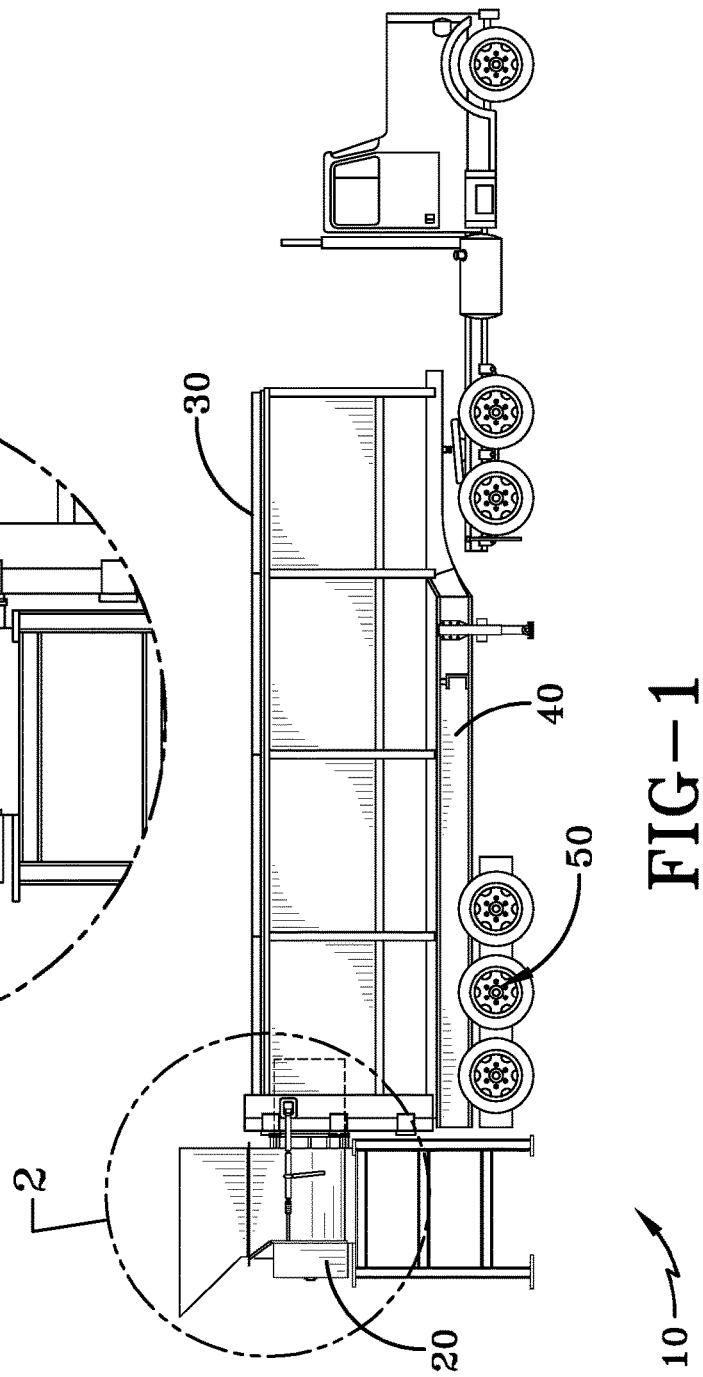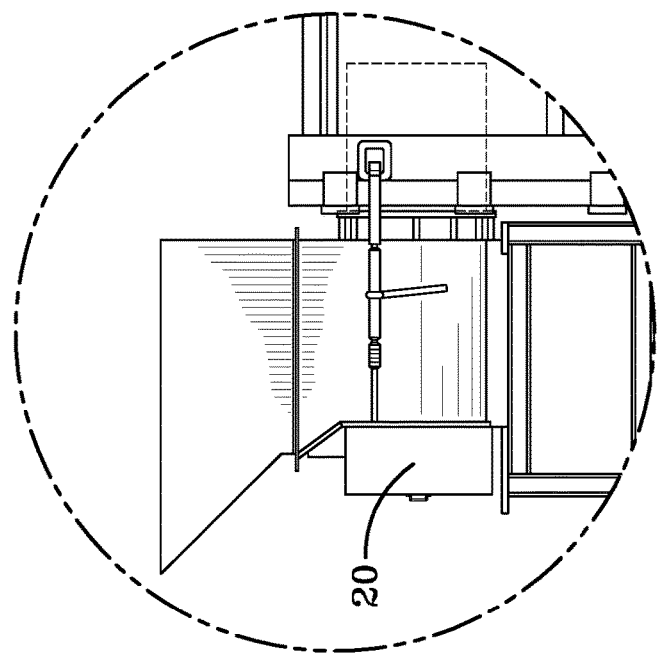

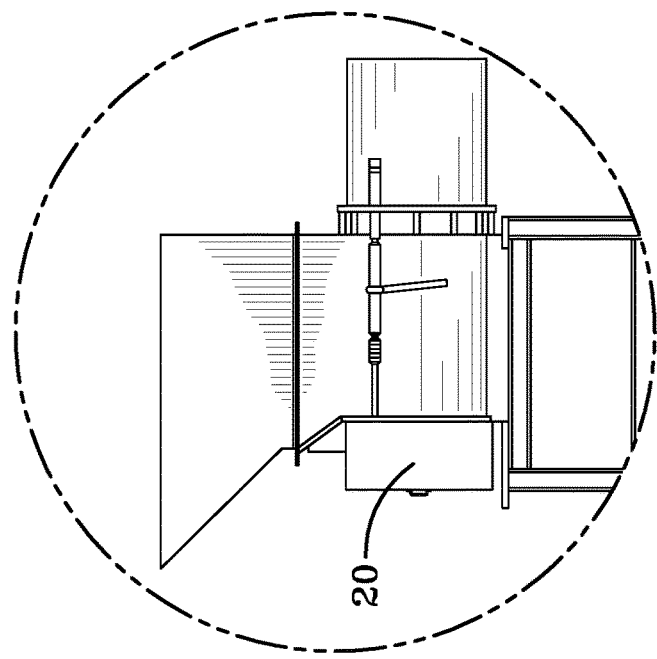
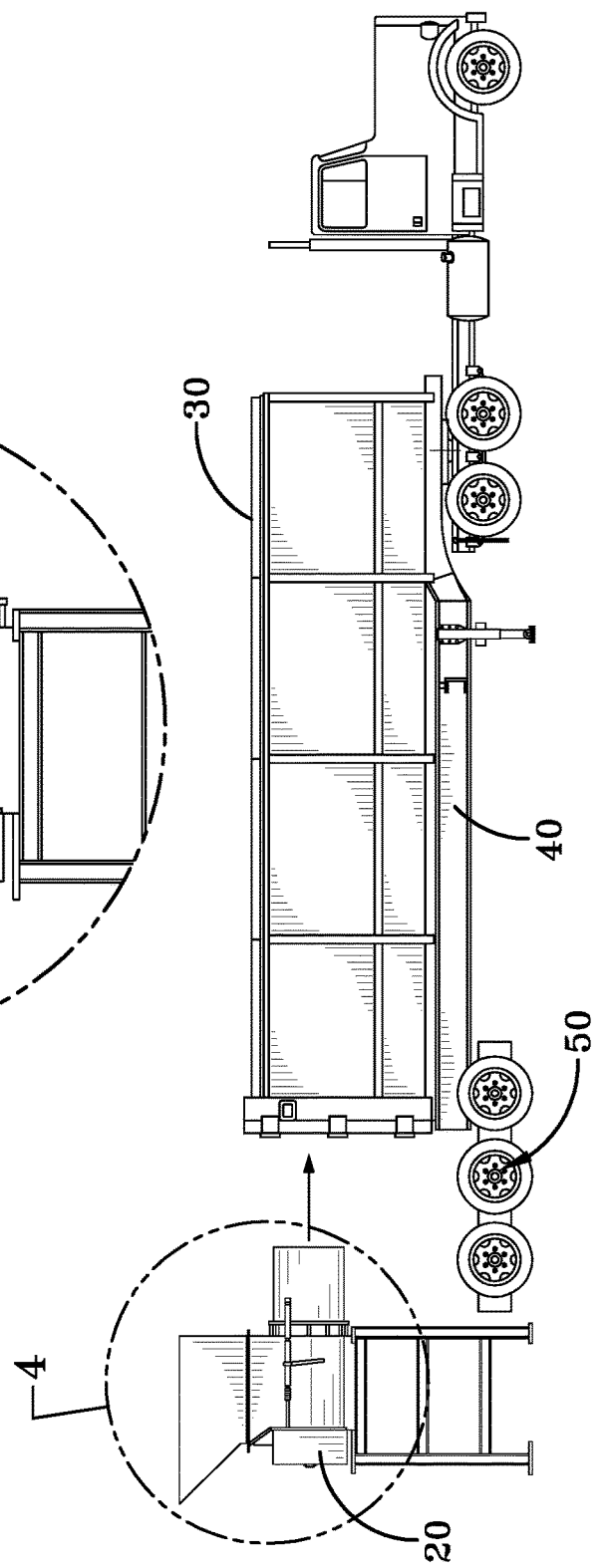

SYSTEM AND METHOD FOR LOADING A TRAILER AND LIMITING THE WEIGHT ON AN AXLE

This application claims the priority benefit of U.S. Provisional Application No. 62/562,354, filed Sep. 22, 2017, and U.S. Provisional Application No. 62/577,458, filed Oct. 26, 2017, each of which is hereby incorporated by reference in its entirety.

BACKGROUND AND SUMMARY OF THE INVENTION

Exemplary embodiments of the present invention relate generally to a system and method for loading a trailer. Trailers may be used for a variety purposes. One such use is to transport waste materials of any sort including, but not limited to, waste from construction sites, fulfillment centers, distribution centers, manufacturing facilities, furniture manufacturers, food waste processors, recycling centers, etc. In particular, waste material may be loaded into a trailer at one location and then be transported via the trailer to another location to be dumped or otherwise removed or used (e.g., recycled). Other types of materials may also be loaded and transported in a trailer. For instance, more valuable materials or goods may be also be loaded and transported in a trailer.

Regardless of the content(s) in the trailer, there is a need to be able to distribute the weight of the content(s) in the trailer. For example, there is often a need to be able to limit the weight on the axles of the trailer, such as may be required by manufacturer guidelines or local, state, or federal laws/regulations. For example, each axle may have a maximum weight rating, which may be referred to as a gross axle weight rating (GAWR), and/or there may be a maximum load in a trailer that includes the weight on all axles, which may be referred as a gross vehicle weight rating (GVWR). Such standards may assist with the structural stability of the trailer (e.g., by limiting or preventing tire malfunction) or the driver's control of the trailer, either of which may help to prevent accidents.

In the case of a covered trailer, a load is often introduced through a rear opening of the trailer. For example, a screw feeder or a ram feeder may be used to feed material through the rear opening of the trailer. For an efficient operation, it may be desirable to be able to fill a trailer to its maximum load, while accounting for any weight restrictions on the trailer and axle(s). It has, however, proved to be difficult to achieve a maximum load. When material (especially, but not limited to, waste material) is introduced through a rear opening of a trailer such as via a screw feeder, a ram feeder, or other means, the heaviest accumulation of material tends to occur at the rear of the trailer, often over the rear axle. As a result, a trailer may not be able to be filled to its maximum capacity without exceeding a weight limitation on an axle. For example, in a trailer having a 20-ton capacity, there may be room for about another 3 to 5 tons of waste material if the weight on the axle(s) could be satisfied. If the weight on an axle exceeds the limit such as may be determined at a highway weighing station, the trailer may have to be dumped on the spot, which is inefficient and obviously creates a mess.

An open top trailer may also encounter similar weight issues. An open top trailer is commonly loaded from the top, and it is difficult to precisely position the material in the trailer in this manner. Excessive weight could result over an axle, which necessitates not filling the trailer to its maximum capacity. As with any trailer, the material may also shift during transportation to cause excessive weight over an axle. In fact, regardless of the material, the method of loading, and the type of trailer, there is a risk that excessive weight could end up on an axle. As a result, trailers are often under filled, which leads to substantially higher transportation costs.

Other known systems have also failed to adequately address the problem of weight on the axles of a trailer. One known system attempts to use an elongated compactor screw that would extend beyond the rear axle of a trailer such that material can be output between the front and rear axles. However, there are substantially increased costs to develop an elongated compactor (as compared to a standard length compactor) for this purpose, and the elongation would significantly reduce the reliability of the compactor due to the enhanced forces on the screw. Another known system utilizes a ram compactor with an extended dischargeable chute and ram to push the load in front of the axles. This makes the compactor more expensive. Moreover, a known system may also use a false plate in association with an elongated screw in order to prevent material from filling the rear portion of the trailer. This false plate needs to be removed, which is labor-intensive and may also be hazardous for the operator. Also, regardless of whether a false plate is utilized, the trailer would not be filled to capacity due to the underutilization of the rear portion of the trailer, which again results in higher transportation costs.

Another known system may use a conventional roll off container that may be fully loaded. The filled container may then be pulled onto a transport trailer such that the container is in front of a rear axle of the transport trailer. This type of system, however, is inefficient. A conventional roll off container may have a relatively small capacity yet still be relatively heavy, and the transport trailer is also heavy, which translates to substantial transportation costs.

In view of these problems, there is a need to be able to control the amount of weight an axle. There are also needs to be able to more fully and/or efficiently load and transport a trailer. A further need also exists to be able to effectively use a screw feeder, ram compactor, or other suitable feed mechanism to load a trailer. Finally, a need exists for an improved system and method for transporting a loaded container.

An exemplary embodiment of the present invention may address some or all of these needs. An exemplary embodiment may comprise a screw feeder, ram compactor, or another suitable feed mechanism that is adapted to feed material into a trailer or other suitable container, which will be collectively referred to herein as a trailer. In one exemplary embodiment, a trailer may have at least one moveable axle that allows for the axle to be positioned such that there is not excessive weight on the axle. In another exemplary embodiment, a container (e.g., trailer) may be secured to a transport trailer (e.g., a transport chassis) that comprises at least one moveable axle that may be positioned to prevent excessive weight on the axle (i.e., reduce an amount of weight on the axle due to the trailer). For example, once the trailer has been filled to a desirable amount, the moveable axle(s) may be repositioned such that there is not excessive weight on the axle(s) during transport of the trailer.

In addition to the novel features and advantages mentioned above, other benefits will be readily apparent from the following descriptions of the drawings and exemplary embodiments.

BRIEF DESCRIPTION OF THE DRAWINGS

FIG. 1 is a side elevation view of an exemplary embodiment of a system for loading and transporting a trailer.

FIG. 2 is a detail view of the exemplary embodiment of a screw feeder shown in FIG. 1.

FIG. 3 is a side elevation view of the system of FIG. 1 showing an exemplary embodiment of a transport chassis with the rear axles repositioned to limit weight on the rear axles.

FIG. 4 is a detail view of the exemplary embodiment of a screw feeder shown in FIG. 3.

DETAILED DESCRIPTION OF EXEMPLARY EMBODIMENT(S)

Figure 5:
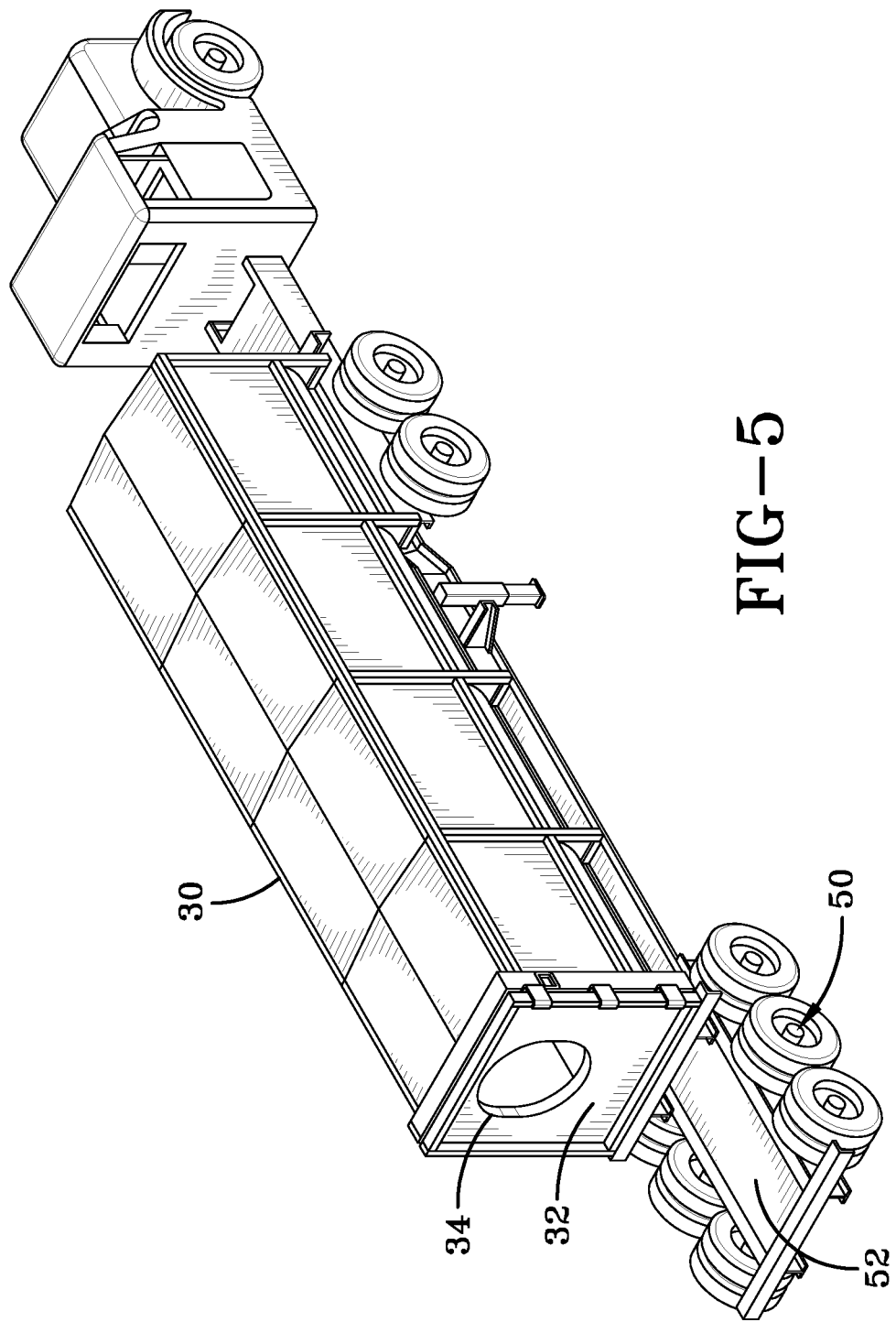
FIG. 5 is a perspective view showing the exemplary embodiments of the trailer and transport chassis of FIG. 3, wherein the rear axles of the transport chassis are in the extended position shown in FIG. 3.

Exemplary embodiments of the present invention are directed to a system and method for loading material into a trailer for transport. Exemplary embodiments of the present invention may be particularly advantageous for the loading and transport of waste materials. Nevertheless, unless expressly set forth otherwise, it is not intended to limit an exemplary embodiment of the present invention to use with any particular type of material, unless expressly set forth otherwise.

FIGS. 1 and 3 show an exemplary embodiment of a system 10 of the present invention. System 10 is comprised of a screw feeder 20 that is adapted to feed material into a trailer 30. In this exemplary embodiment, trailer 30 is positioned on and secured to a transport chassis 40, which has a set of moveable rear axles 50 to facilitate movement of the trailer. In an exemplary operation, trailer 30 may be backed up or otherwise moved to screw feeder 20 (or vice versa) in order to be loaded with material. The set of moveable rear axles 50 are in an unextended or retracted position beneath trailer 30 in FIG. 1, which allows for trailer 30 to be positioned closely to screw feeder 20. Such as in this manner, an exemplary embodiment of the present invention may eliminate the need for a further elongated screw to feed material into a trailer.

In an exemplary embodiment, screw feeder 20 or another feed mechanism (e.g., ram compactor) may fill trailer 30 to or near its maximum capacity for optimum efficiency. However, in some exemplary methods, a screw feeder or other feed mechanism may fill a trailer to a lesser degree, if desired.

An exemplary embodiment of trailer 30 may be any suitable type and size of trailer. In an exemplary embodiment, a trailer 30 may be a 60 cubic yard box trailer having a capacity of at least 20 tons. Such a box trailer may provide optimum efficiency and ease of transportation for many applications, especially for waste materials. Another suitable type of container is a roll off container (e.g., a 40 cubic yard roll off container having a capacity of at least 9 tons). In view of such examples, other types and sizes of trailers may also be useful in some exemplary embodiments of the present invention.

Once trailer 30 has been filled to a desired amount by screw feeder 20, trailer 30 and transport chassis 40 may be prepared for transport. Such as shown in FIGS. 3 and 5, the set of moveable rear axles 50 may be repositioned to prevent being subject to excess weight. In particular, the set of moveable rear axles 50 extend away from the body of transport chassis 40 and at least partially beyond a side (e.g., rear) of trailer 30. In this example, a slider block 52 slides on roller bearings to facilitate the repositioning of the set of moveable rear axles 50. An example of this type of transport chassis is commercially available from Pro-Haul of Gallipolis, Ohio. Other types of transport chassis are also commercially available from Pro-Haul, or may be available from other sources. Other suitable movement mechanisms for an axle may also be utilized. In this example, transport chassis 40 has three moveable axles. Other exemplary embodiments may have fewer or more moveable axles, and/or the axle(s) may be at another location on the transport chassis. In addition, other exemplary embodiments may have at least one other moveable axle at another location on the transport chassis (e.g., at a rear location and a front or side location on the transport chassis). As a result, in an exemplary embodiment, a moveable axle may be positioned such that it is adapted to extend at least partially beyond any side (e.g., rear, front, or intermediate side) of a trailer.

Some exemplary embodiments may not have transport chassis. For example, any of the aforementioned moveable axles may instead be an integral portion of or otherwise be in association with a trailer (instead of being a component of a transport chassis that is secured to a trailer such as by welding, mechanical fasteners, etc.). A moveable axle on or in association with a trailer may otherwise be similar to a moveable axle on a transport chassis.

Figure 6:
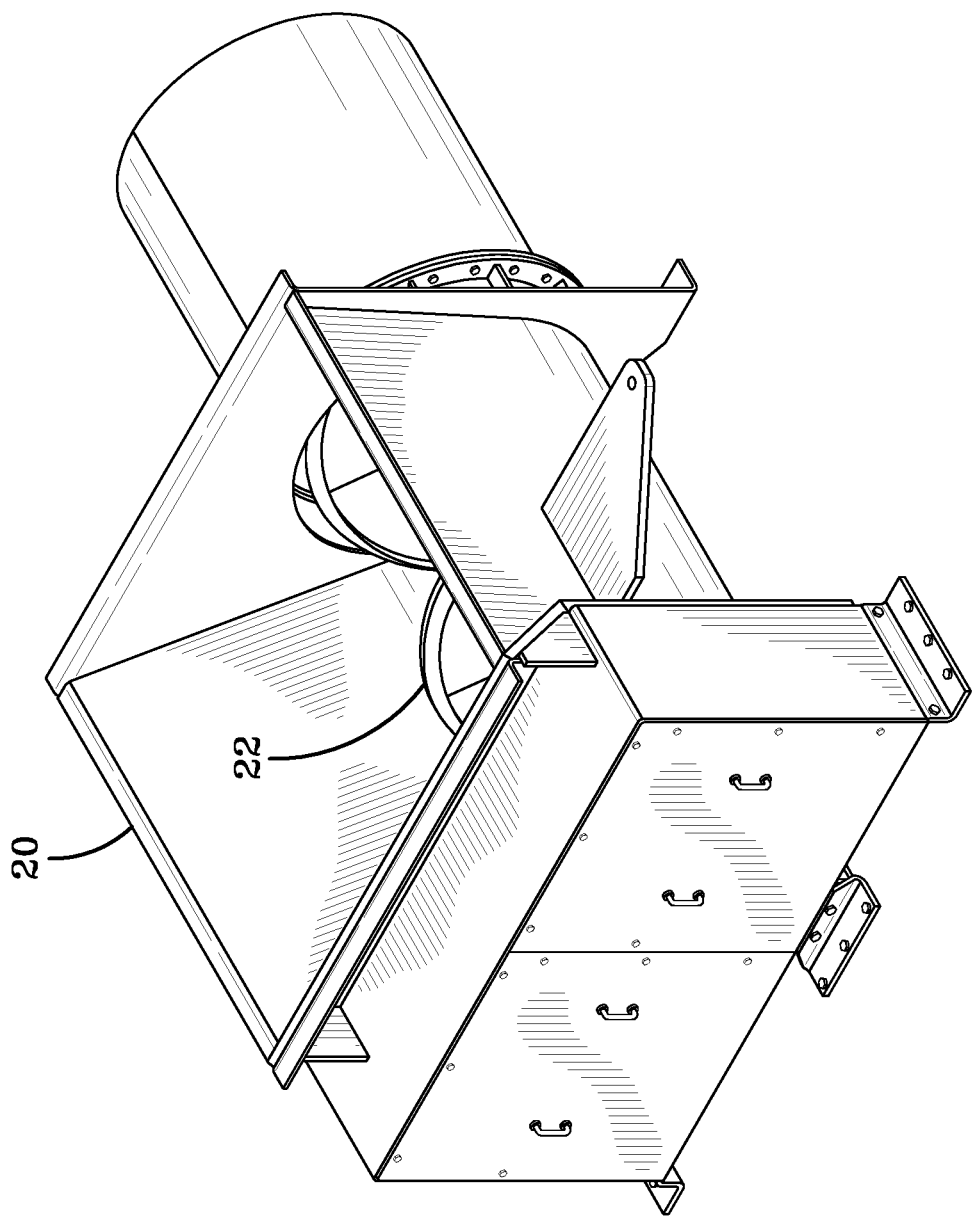
FIG. 6 is a perspective view of the exemplary embodiment of a screw feeder shown in FIGS. 1-4.

FIG. 6 provides another view of screw feeder 20. This embodiment of screw feeder 20 is comprised of a single screw 22. Other embodiments may be comprised of multiple screws. Furthermore, an example of a screw may be straight or have a forward or reverse taper. For example, various types of screw feeders are available from Komar Industries. One such example is a cantilevered screw assembly such as shown in FIG. 6. In an exemplary embodiment, as the screw feeder 20 loads material into trailer 30, it may also compact the material in trailer 30 to facilitate filling trailer 30 to an optimal capacity.

Screw feeder 20 may be positioned at any height in order to feed material into trailer 30. In this example, trailer 30 has a rear wall 32 in order to block material from inadvertently exiting trailer 30, whereas an opening 34 in wall 32 provides an entry point into trailer 30. Such as shown in FIGS. 1 and 2, the output (i.e., screw) of screw feeder 20 may be aligned with and/or extend through opening 34 (or vice versa) in order to load material into trailer 30.

A screw feeder is particularly beneficial for loading a trailer. In particular, an exemplary embodiment of a screw feeder may be configured to substantially continuously feed material into a trailer for optimal efficiency. Moreover, a screw feeder may have a cantilevered screw, which may be particularly useful for feeding material into a trailer (e.g., such as described in the above example). However, some embodiments of a screw feeder may not have a cantilevered screw.

Figure 7:
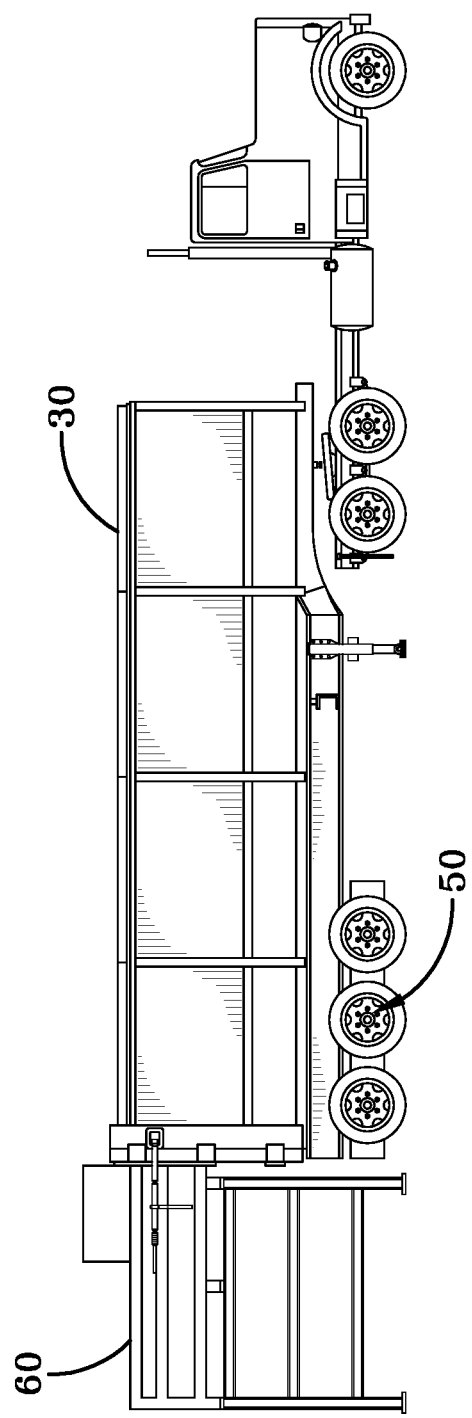
FIG. 7 is a side elevation view of an exemplary embodiment of another system for loading and transporting a trailer, which comprises a ram compactor for loading material into the trailer.

Other suitable feed mechanisms may also be used. For example, a feed mechanism may have any suitable power source and any suitable means for inputting material, unless expressly set forth otherwise. FIG. 7 shows an example that uses a ram compactor 60 to load material into a trailer 30. For example, a ram compactor 60 or any other type of feed delivery system may also be aligned with and/or extend through opening 34 (or vice versa) in order to load material into trailer 30.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system comprising:
 a screw feed delivery system comprising at least one screw adapted to deliver material;
 a trailer adapted to receive material delivered by said screw feed delivery system, said trailer comprising a rear wall that extends completely across a rear of said trailer such that said rear wall is adapted to block material from inadvertently exiting said trailer, and said rear wall defining an opening disposed primarily in an upper half of said rear wall through which said at least one screw of said screw feed delivery system is adapted to deliver material into said trailer; and
 a plurality of axles in association with said trailer to facilitate movement of said trailer, said plurality of axles adapted to be moved to reduce an amount of weight on said plurality of axles due to said trailer;
 wherein said plurality of axles a first position is positioned underneath said trailer to facilitate receipt of material by said trailer; and
 wherein said plurality of axles is adapted to be moved to a second position in which at least one axle of said plurality of axles remains underneath said trailer and at least two axles of said plurality of axles are positioned beyond a side of said trailer after receipt of material by said trailer to facilitate travel away from said screw feed delivery system.

2. The system of claim 1 wherein said at least one screw is cantilevered.

3. The system of claim 1 wherein said at least one screw is adapted to be aligned with or extend through said opening in order to load material into said trailer.

4. The system of claim 1 wherein said plurality of axles is adapted to be moved such that said at least two axles extend beyond said rear of said trailer.

5. The system of claim 1 wherein said plurality of axles comprises a set of three axles.

6. The system of claim 1 wherein said trailer comprises said plurality of axles.

7. The system of claim 1 further comprising:
 a transport chassis that comprises said plurality of axles;
 wherein said trailer is positioned on said transport chassis.

8. The system of claim 1 wherein said screw feed delivery system has a base that is situated outside of said trailer.

9. The system of claim 1 wherein said trailer comprises said plurality of axles.

10. The system of claim 1 further comprising:
 a transport chassis that comprises said plurality of axles;
 wherein said trailer is positioned on said transport chassis.

11. A method comprising:
 providing a screw feed delivery system and a trailer adapted to receive material from said screw feed delivery system, said screw feed delivery system comprising at least one screw, said trailer comprising a rear wall that extends completely across a rear of said trailer such that said rear wall is adapted to block material from inadvertently exiting said trailer, and said rear wall defining an opening disposed primarily in an upper half of said rear wall through which said at least one screw of said screw feed delivery system is adapted to deliver material into said trailer;
 feeding material with said at least one screw of said screw feed delivery system into said trailer; and
 after filling said trailer with said material to a desired amount, moving a plurality of axles that is in association with said trailer to reduce an amount of weight on said plurality of axles due to said trailer;
 wherein said plurality of axles in a first position is positioned underneath said trailer to facilitate filling said trailer; and
 wherein said plurality of axles is moved to a second position in which at least one axle of said plurality of axles remains underneath said trailer and at least two axles of said plurality of axles are positioned beyond a side of said trailer after said trailer is filled to facilitate travel away from said screw feed delivery system.

12. The method of claim 11 wherein said at least one screw is cantilevered.

13. The method of claim 11 wherein said at least one screw is aligned with or extends through said opening in order to feed said material into said trailer.

14. The method of claim 11 wherein said at plurality of axles is moved such that said two axles extend beyond said rear of said trailer.

15. The method of claim 11 wherein said plurality of axles comprises a set of three axles.

16. The method of claim 11 wherein said trailer comprises said plurality of axles.

17. The method of claim 11 further comprising the step of:
 providing a transport chassis that comprises said plurality of axles;
 wherein said trailer is positioned on said transport chassis.

18. The method of claim 11 wherein said plurality of axles is retracted in said first position when said material is fed from said screw feed delivery system into said trailer.

19. The method of claim 11 wherein said screw feed delivery system has a base that is situated outside of said trailer.

20. A system comprising:
 a screw feed delivery system comprising a base and at least one cantilevered screw adapted to deliver material;
 a trailer adapted to receive material delivered by said screw feed delivery system, said trailer comprising a rear wall that extends completely across a rear of said trailer such that said rear wall is adapted to block material from inadvertently exiting said trailer, and said rear wall defining an opening disposed primarily in an upper half of said rear wall through which said at least one cantilevered screw of said screw feed delivery system is adapted to deliver material into said trailer; and
 a plurality of axles in association with said trailer to facilitate movement of said trailer, said plurality of axles adapted to be moved to reduce an amount of weight on said plurality of axles due to said trailer;

wherein said base of said screw feed delivery system is situated outside of said trailer;

wherein said plurality of axles in a first position is positioned underneath said trailer to facilitate receipt of material by said trailer; and wherein said plurality of axles is adapted to be moved to a second position in which at least one axle of said plurality of axles remains underneath said trailer and at least two axles of said plurality of axles are positioned beyond said rear of said trailer after receipt of material by said trailer to facilitate travel away from said screw feed delivery system.

* * * * *

UNITED STATES PATENT AND TRADEMARK OFFICE
CERTIFICATE OF CORRECTION

PATENT NO. : 11,186,215 B2  
APPLICATION NO. : 16/138549  
DATED : November 30, 2021  
INVENTOR(S) : Koenig Page 1 of 1

It is certified that error appears in the above-identified patent and that said Letters Patent is hereby corrected as shown below:

In the Claims

Column 6, Claim 14, Line 33, delete "at".

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*